US012783371B2

(12) United States Patent
Chen et al.

(10) Patent No.: US 12,783,371 B2
(45) Date of Patent: Nov. 3, 2026

(54) MEMORY CARD READING DEVICE

(71) Applicant: Realtek Semiconductor Corporation, Hsinchu (TW)

(72) Inventors: Chien Nan Chen, Hsinchu (TW); Jiunn Hung Shiau, Hsinchu (TW); Neng Hsien Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 19/082,116

(22) Filed: Mar. 17, 2025

(65) Prior Publication Data

US 2025/0307089 A1 Oct. 2, 2025

(30) Foreign Application Priority Data

Apr. 2, 2024 (TW) ................................ 113112614

(51) Int. Cl.
*G06F 11/20* (2006.01)
*G06F 11/16* (2006.01)
*G06F 11/32* (2006.01)

(52) U.S. Cl.
CPC ........ *G06F 11/2033* (2013.01); *G06F 11/165* (2013.01); *G06F 11/325* (2013.01)

(58) Field of Classification Search
CPC .. G06F 11/2033; G06F 11/165; G06F 11/325; G06F 11/3037
USPC .......................................................... 714/6.3
See application file for complete search history.

(56) References Cited

U.S. PATENT DOCUMENTS

2012/0265910 A1* 10/2012 Galles ................ G06F 11/2005 710/300
2022/0226671 A1* 7/2022 Bouakaz ................. A61N 7/00
2025/0324334 A1* 10/2025 Khoshkholgh Dashtaki et al. ..... H04B 7/18513

FOREIGN PATENT DOCUMENTS

TW 201908917 A 3/2019

* cited by examiner

*Primary Examiner* — Yair Leibovich
(74) *Attorney, Agent, or Firm* — CKC & Partners Co., LLC

(57) ABSTRACT

This invention provides a memory card reading device, which includes a communication interface, one or more slots, and a controller. The slot is used for electrically connecting to a memory card. When executing an access command on the memory card, the controller determines whether an error has occurred based on busy duration. When multiple memory cards are disposed and the error meets a switching condition, the controller will switch to another memory card for further usage.

13 Claims, 3 Drawing Sheets

MEMORY CARD READING DEVICE

CROSS-REFERENCE TO RELATED APPLICATION

This application claims priority to Taiwan Application Serial Number 113112614, filed Apr. 2, 2024, which is herein incorporated by reference in its entirety.

BACKGROUND

Field of Invention

This disclosure relates to a memory card reading device that can automatically detect the status of a memory card and perform corresponding operations.

Description of Related Art

With the advent of the information age and the gradual reduction in the cost of storage devices, the storage devices are increasingly common in various applications. However, the storage devices such as hard disk drives (HDD), solid state disks (SSD), and flash memory wear out over prolonged use, eventually leading to a device failure and data loss. Existing storage device monitoring mechanisms include S.M.A.R.T. (Self-Monitoring Analysis and Reporting Technology), which is a standard for detecting and warning of a hard disk status. The hard disks record their own health indicators and values in the hard disks are read through commands to assess a risk of damage.

However, current S.M.A.R.T. implementations are mostly passively triggered; if a user does not actively retrieve the information, the system cannot proactively notify of existing damage risks, thus potentially leading to accidental data loss for the user. Moreover, prevalence of S.M.A.R.T.-supported storage devices, aside from the hard disks, is limited. Without emergency measures, it is difficult to timely salvage user data.

SUMMARY

Embodiments of the present disclosure provide a memory card reading device including a communication interface, a first slot, a second slot, and a controller. The communication interface is electrically connected to an electronic device. The first slot is electrically connected to a first memory card. The second slot is electrically connected to a second memory card. The controller is electrically connected to the communication interface, the first slot, and the second slot, and configured to set the first slot to be an activated slot, receive an access command from the electronic device, and access the first memory card according to the access command. The controller is also configured to determine whether an error occurs when performing the access command, and determine whether the error satisfies a switching condition. If the error satisfies the switching condition, the controller is configured to set the second slot to be the activated slot.

From another aspect, embodiments of the present disclosure provide a memory card reading device including a communication interface, a slot, and a controller. The communication interface is electrically connected to an electronic device. The slot is electrically connected to a memory card. The controller is electrically connected to the communication interface and the slot, and configured to receive an access command from the electronic device, and access the memory card according to the access command. The controller is also configured to obtain a busy duration of executing the access command, and determine whether the busy duration is greater than a duration threshold. If the busy duration is greater than the duration threshold, the controller is configured to determine that an error occurs.

From another aspect, embodiments of the present disclosure provide a method for controlling a memory card reading device. The method includes: setting a first slot of the memory card reading device to be an activated slot, receive an access command from an electronic device, and access a first memory card electrically connected to the first slot according to the access command; determining whether an error occurs when performing the access command, and determining whether the error satisfies a switching condition; and if the error satisfies the switching condition, setting a second slot of the memory card reading device to be the activated slot.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
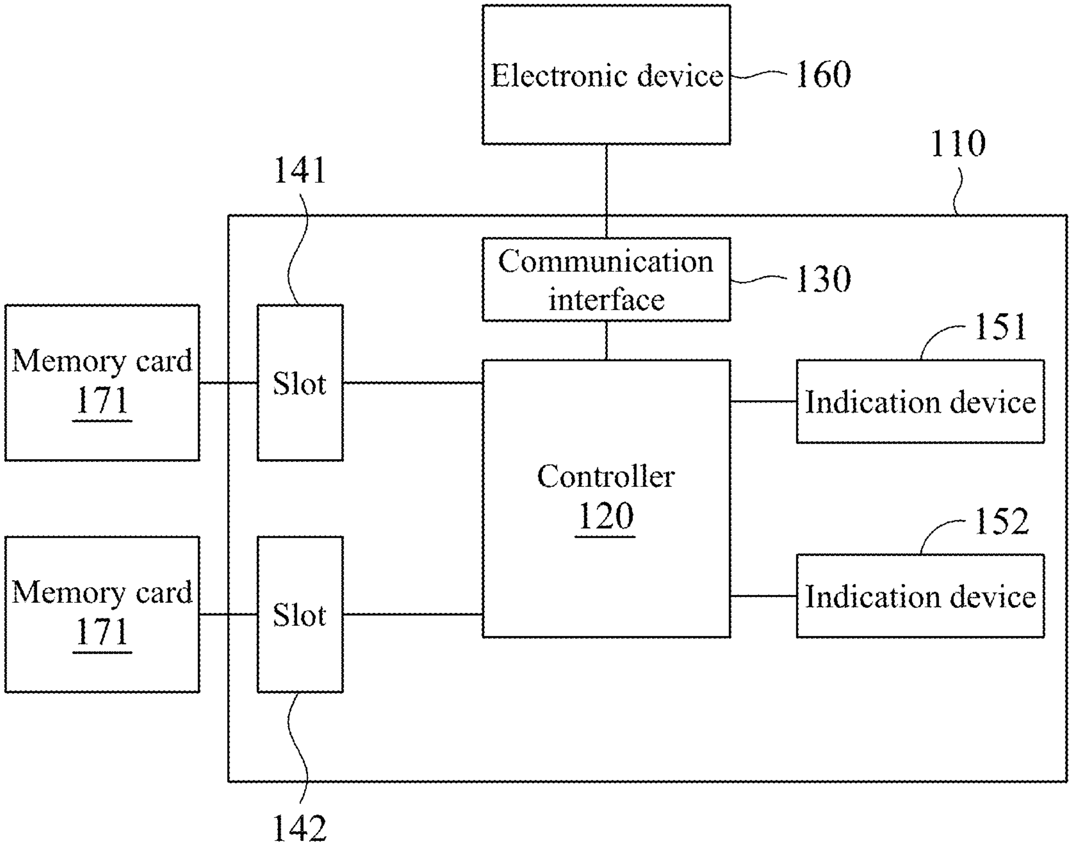
FIG. 1 illustrates a schematic diagram of a memory card reading device according to the first embodiment.

Reference will now be made in detail to the present embodiments of the invention, examples of which are illustrated in the accompanying drawings. Wherever possible, the same reference numbers are used in the drawings and the description to refer to the same or like parts.

This disclosure proposes a memory card reading device, bridged between an electronic device and a memory card. This memory card reading device can automatically detect a health status of the memory card and switch to another memory card when necessary to prevent data loss due to damage. Several examples will be illustrated below.

First Embodiment

FIG. 1 illustrates a schematic diagram of a memory card reading device according to the first embodiment. Referring to FIG. 1, a memory card reading device 110 serves to bridge between an electronic device 160 and memory cards 171, 172. The electronic device 160 may be a personal computer, a laptop, a mobile phone, a tablet, a surveillance system, a server, etc., and this disclosure is not limited to these examples. The memory cards 171, 172 contain flash memory. In some embodiments, the memory card reading device 110, also known as a card reader, is an independent device while the electronic device 160, for example, is a mobile phone. In some embodiments, the memory card reading device 110 and memory cards 171, 172 are set within a same device; for example, the memory card reading device 110 is a chip on a circuit board, and memory cards 171, 172 are soldered onto the same circuit board. In some embodiments, the memory card reading device 110 is integrated with the electronic device 160 within the same device, such as when the electronic device 160 is a surveillance system (including cameras, processors, etc.), and the memory card reading device 110 is a circuit or a chip within the system. In other words, the memory card reading device 110 can either be an independent device or be set up on the same circuit board or within the same device as the electronic device 160 and memory cards 171, 172.

The memory card reading device 110 includes a controller 120, a communication interface 130, slots 141, 142, and indication devices 151, 152. The controller 120 is electrically connected to the communication interface 130, the slots 141, 142, and the indication devices 151, 152. The controller 120, also referred to as a control circuit, is designed to receive access commands (such as read or write commands) from the electronic device 160 and execute corresponding operations on the memory cards 171, 172. The communication interface 130 facilitates electrical connection to the electronic device 160 and may be a port or a circuit complying with specification(s) such as Universal Serial Bus (USB) or Peripheral Component Interconnect Express (PCIe). The slot 141 is electrically connected to the memory card 171, and the slot 142 is electrically connected to the memory card 172, where the slots 141, 142 may be ports or circuits complying with storage specification(s) such as Secure Digital (SD), Universal Flash Storage (UFS), Embedded Multimedia Card (eMMC), or Multimedia Card (MMC). The indication devices 151, 152 provide information to the user, which can be conveyed through light (e.g., LED indicators), sound, or an image. For example, the indication devices 151, 152 can be light-emitting diodes (LEDs), buzzers, display panels, etc.

Figure 2:
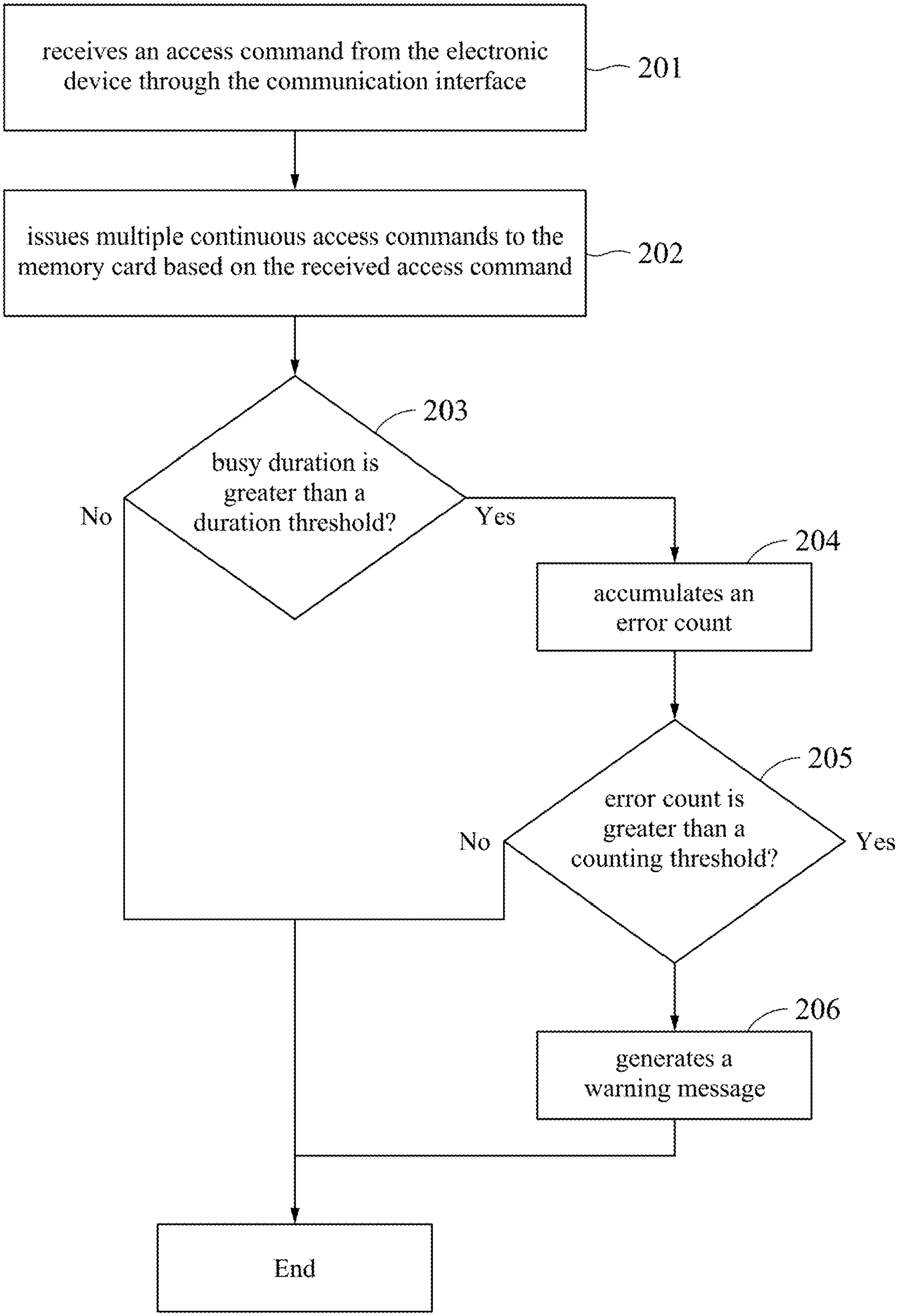
FIG. 2 illustrates a flowchart of the memory card health status detection method according to the first embodiment.

FIG. 2 illustrates a flowchart of the memory card health status detection method according to the first embodiment. Referring to FIG. 2, in a step 201, the controller 120 receives an access command from the electronic device 160 through the communication interface 130. This access command can be a read or write instruction. For example, this access command is to read 1 MB of data from the memory card 171. The access command may include information such as data's address and size.

In a step 202, the controller 120 issues multiple continuous access commands to the memory card 171 based on the received access command, where each continuous access command is for accessing smaller portions of the data (e.g., 4 kB each). There are multiple signal lines between the memory card 171 and the slot 141 for transmitting data, commands, or other signals. When the controller 120 sends a continuous access command to the memory card 171, one of the signal lines (for example, the DATO line in the SD specification) is set to indicate a busy state. Then, memory card 171 executes the continuous access command through its internal control chip (not shown). Once the internal control chip of the memory card 171 completes the continuous access command, it resets the signal line to clear the busy state. The controller 120 calculates a busy duration of the memory card 171 based on a status of this signal line. Since one access command corresponds to multiple continuous access commands, it also corresponds to multiple busy durations (one continuous access command corresponds to one busy duration).

As wear of the memory card 171 progresses, the busy duration of each execution of the continuous access commands may increase. For instance, if some flash memory blocks in the memory card 171 reach or approach their erase cycle limits and become unusable, it would take longer for the memory card 171 to perform data writing and relocation. In a step 203, the controller 120 obtains any busy duration of executing an access command and determines whether this busy duration is greater than a duration threshold. If the busy duration is not greater than the duration threshold, the process moves to a next continuous access command until all continuous access commands are completed. If the busy duration is greater than the duration threshold, the controller 120 determines that an error has occurred. In some embodiments, when an error occurs, in a step 204, the controller 120 accumulates an error count based on the error. In a step 205, the controller 120 determines whether this error count is greater than a counting threshold. If the error count is not greater than does the counting threshold, it indicates that a damage to the memory card 171 is not severe, and the process can proceed to the next continuous access command until all continuous access commands are completed. If the error count is greater than the counting threshold, then in a step 206, the controller 120 generates a warning message, which can be conveyed through the indication device 151, such as lighting up the light-emitting diode, emitting a specific sound from the buzzer, or displaying a particular pattern on the display panel. In some embodiments, the controller 120 can transmit the warning message to the electronic device 160 in the form of text, numbers, or binary, among others.

In the aforementioned embodiment, the step 203 involves obtaining one of the multiple busy durations corresponding to the access command to make the determination. In other embodiments, the process may evaluate all the busy durations associated with the access command. When each busy duration is greater than the duration threshold, the steps 204 and 205 are executed.

Due to varying characteristics of each memory card, the aforementioned duration threshold is adaptively determined. In some embodiments, the controller 120 initially issues several test continuous access commands to the memory card 171 and collects corresponding busy durations (referred to as history busy durations). Next, the controller 120 calculates a mean and a standard deviation of these history busy durations and sets the duration threshold based on the mean and the standard deviation. For example, controller 120 may set the duration threshold as the mean plus n times the standard deviation, where n is a positive number, such as 2, 2.5, 3, etc.

In some embodiments, machine learning techniques can also be used to set the aforementioned duration threshold. For example, memory cards are obtained from the same model, the same batch, similar production date, or with other identical (or similar) hardware characteristics as the memory card 171. Several test continuous access commands are issued to these memory cards to calculate corresponding busy durations and whether the memory cards fail is recorded. After a memory card fails, a corresponding label can be generated, which is used to indicate (or determine) whether the memory card will fail in the future. Subsequently, the busy durations are taken as inputs for a machine learning model, and the labels are model's outputs for training. This machine learning model could be a linear equation, polynomial equation, exponential equation, or a more complex neural network, among others, without being limited to these options. The trained machine learning model can then be applied to the memory card 171, and each time a busy duration is generated by the memory card 171, this busy duration is input into the machine learning model to determine whether it is about to fail.

In the embodiment of FIG. 1, the memory card reading device 110 includes two slots 141, 142, and the method depicted in FIG. 2 can be applied to either memory card 171 or 172. For example, when applied to the memory card 172, a warning message can be provided through the indication device 152 at the step 206. In some embodiments, the memory card reading device 110 may have only one slot. The method shown in FIG. 2 does not require the memory card reading device 110 to have multiple slots.

Second Embodiment

Figure 3:
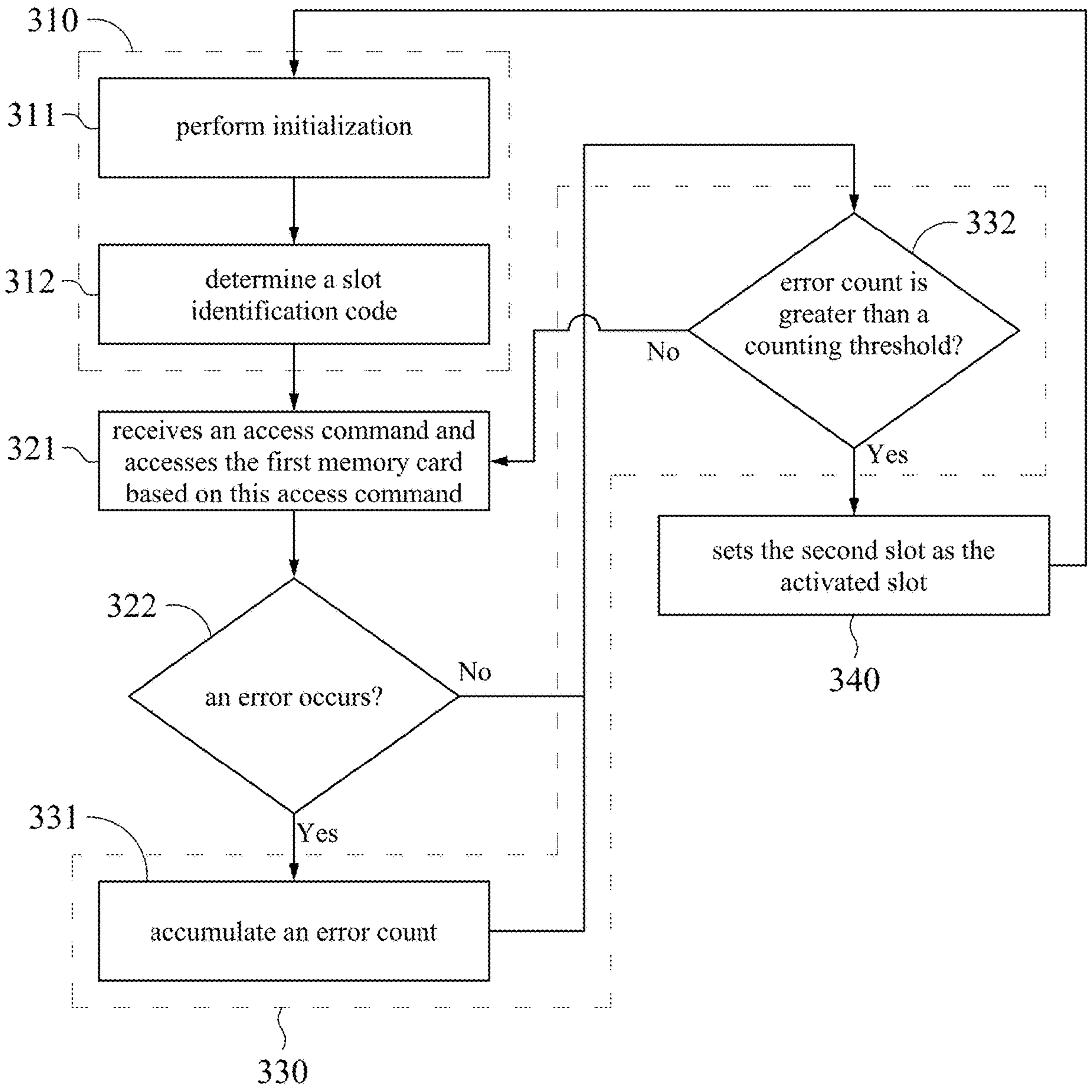
FIG. 3 illustrates a control method of the memory card reading device according to the second embodiment.

In the second embodiment, a hardware architecture of the memory card reading device is the same as shown in FIG. 1. However, unlike the first embodiment, it is determined whether a memory card is damaged and should not be continued to be used in the second embodiment; if so, the system switches to another memory card. FIG. 3 illustrates a control method of the memory card reading device according to the second embodiment. Referring to FIGS. 1 and 3, in a step 310, the controller 120 sets the slot 141 as an activated slot. In this embodiment, only one slot is activated at a time; the corresponding memory card is used when its slot is activated, and if a slot is not activated, the corresponding memory card is not used. Thus, when the slot 141 is the activated slot, only the memory card 171 is utilized. Specifically, the step 310 includes steps 311 and 312. In the step 311, initialization is performed in which the controller 120 performs a USB or PCIe interface initialization process with the electronic device 160, providing information such as a size and a type of the memory card 171. In the step 312, a slot identification code is determined, for example, the identification code for the slot 141 is "1", and for the slot 142 is "2". The controller 120 will initially select the identification code "1".

In a step 321, the controller 120 receives an access command from the electronic device 160 via the communication interface 130 and accesses the currently used memory card 171 based on this access command. As described in the first embodiment, the access command can be a read or write instruction, and the controller 120 will issue multiple continuous access commands to the memory card 171 based on this access command, with each access command corresponding to a busy duration.

In a step 322, the controller 120 determines whether an error occurred during the execution of the access command. There are various ways to detect the occurrence of an error. For example, similar to the first embodiment, it may be determined by whether the busy duration exceeds a duration threshold. In other embodiments, errors can be identified based on an error correction code (ECC) in the memory card 171. In some instances, status information returned by the memory card 171 during the access command execution, such as a health report in eMMC or UFS specification(s), can also be used by the controller 120 to determine whether an error has occurred. In some embodiments, the controller 120 can calculate a transmission rate of the memory card, and it is determined that an error occurs if the transmission rate falls below a threshold.

If the result in the step 322 is affirmative, in a step 330, the controller 120 determines whether the error satisfies a switching condition. When the switching condition is met, it indicates that the memory card 171 has experienced a certain level of wear and continuing its use could lead to data loss, thus necessitating a switch to another memory card 172. In this embodiment, the step 330 includes steps 331 and 332. In the step 331, an error count is accumulated based on the error. In the step 332, it is determined whether the error count is greater than the counting threshold. If the error count is not greater than the counting threshold, the process returns to the step 321 to accept a next access command. If the error count is greater than the counting threshold, indicating that the switching condition is satisfied, then in a step 340, the controller 120 sets the slot 142 as the activated slot. Upon executing the step 311 for the second time, the controller 120 and the electronic device 160 perform initialization to provide information about the memory card 172, and the slot identification code "2" is selected in the step 312.

In other embodiments, it is determined whether an error satisfies the switching condition based on the health report returned by the memory card in the step 330. For example, information is read from the health report such as VENDOR_PROPRIETARY_HEALTH_REPORT [301-270], DEVICE_LIFE_TIME_EST_TYP_B [269], DEVICE_LIFE_TIME_EST_TYP_A [268], PRE_EOL_INFO [267], and other information defined in the UFS specification such as bPreEOLInfo, bDeviceLifeTimeEstA, bDeviceLifeTimeEstB, and VendorPropInfo. In other embodiments, the busy duration can be input into the machine learning model mentioned in the first embodiment, and the switching condition can be determined based on an output value of the model.

Referring to FIG. 1, in some embodiments, health statuses of the memory cards 171, 172 are communicated to the user through the indication devices 151, 152. For example, before receiving an access command, the controller 120 sets the indication devices 151, 152 to be in a healthy mode. This healthy mode could involve setting the light-emitting diodes to be off, the buzzers to be silent, or the display panels to show a first pattern. In other words, when the slot 141 is set as the activated slot, the indication devices 151, 152 are in the healthy mode. When the activated slot switches to the slot 142 (due to meeting the switching condition), it indicates that the slot 141 has worn out; therefore, the controller 120 will set the indication device 151 to be in an abnormal mode. For example, this could involve setting the light-emitting diodes to be on (lit), the buzzers to emit sound, or the display panels to show a second pattern, etc. This way, the user can recognize the health statuses of the memory cards 171, 172 through the light, the sound, and the patterns provided by the indication devices 151, 152.

This disclosure provides two embodiments, which can be implemented independently or in combination. For example, the step 322 in FIG. 3 could adopt the approach from the first embodiment or utilize alternative methods. The method provided in the first embodiment can be used to determine whether to switch memory cards and can also be used solely to assess the health status of a memory card. Moreover, the hardware architectures in the two embodiments do not need to be the same. For instance, in the first embodiment, the memory card reading device may include one or more slots, whereas in the second embodiment, the memory card reading device includes two or more slots.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A memory card reading device, comprising:

a communication interface, electrically connected to an electronic device;

a first slot, electrically connected to a first memory card;

a second slot, electrically connected to a second memory card; and a controller, electrically connected to the communication interface, the first slot, and the second slot, and configured to set the first slot to be an activated slot, receive an access command from the electronic device, and access the first memory card according to the access command, wherein the controller is configured to issue a plurality of continuous access commands to the first memory card according to the access command, obtain a busy duration of executing one of the plurality of continuous access commands by the first memory card, and determine whether the busy duration is greater than a duration threshold, determine an error occurs when performing the access command in response to determining that the busy duration is greater than a duration threshold, and determine whether the error satisfies a switching condition, and in response to determining that the error satisfies the switching condition, set the second slot to be the activated slot, wherein the controller is further configured to obtain a plurality of history busy durations of the first memory card, calculate a mean and a standard deviation of the plurality of history busy durations, and set the duration threshold according to the mean and the standard deviation.

2. The memory card reading device of claim 1, wherein in response to determining that the error occurs, the controller is configured to accumulate an error count based on the error and determine whether the error count is greater than a counting threshold, wherein in response to determining that the error count is greater than the counting threshold, the controller is configured to determine that the switching condition is satisfied.

3. The memory card reading device of claim 1, further comprising:

a first indication device; and a second indication device, wherein before receiving the access command, the controller is configured to set the first indication device to be in a healthy mode, and set the second indication device to be in the healthy mode, wherein in response to determining that the error satisfies the switching condition, the controller is configured to switch the first indication device into an abnormal mode.

4. The memory card reading device of claim 3, wherein the first indication device and the second indication device are light-emitting diodes or buzzers.

5. The memory card reading device of claim 1, wherein the first slot and the second slot comply with a Secure Digital (SD) specification, an Universal Flash Storage (UFS) specification, an embedded Multimedia Card (eMMC) specification, or a Multimedia Card (MMC) specification.

6. The memory card reading device of claim 1, wherein the communication interface complies with a Universal Serial Bus (USB) specification or a Peripheral Component Interconnect Express (PCIE) specification.

7. A memory card reading device, comprising:

a communication interface, electrically connected to an electronic device;

a slot, electrically connected to a memory card; and a controller, electrically connected to the communication interface and the slot, and configured to receive an access command from the electronic device, and access the memory card according to the access command, wherein the controller is configured to issue a plurality of continuous access commands to the memory card according to the access command and obtain a busy duration of executing one of the plurality of continuous access commands, and determine whether the busy duration is greater than a duration threshold, wherein the controller is configured to obtain a plurality of history busy durations of the memory card, calculate a mean and a standard deviation of the plurality of history busy durations, and set the duration threshold according to the mean and the standard deviation, wherein in response to determining that the busy duration is greater than the duration threshold, the controller is configured to determine that an error occurs.

8. The memory card reading device of claim 7, wherein the controller is configured to set the duration threshold as the mean plus n times the standard deviation, where n is a positive number.

9. The memory card reading device of claim 7, wherein in response to determining that the error occurs, the controller is configured to accumulate an error count based on the error and determine whether the error count is greater than a counting threshold, wherein in response to determining that the error count is greater than the counting threshold, the controller is configured to generate a warning message.

10. The memory card reading device of claim 9, further comprising an indication device, wherein the controller is configured to issue the warning message through the indication device, and the indication device is a light-emitting diode or a buzzer.

11. A method for controlling a memory card reading device, the method comprising:

setting a first slot of the memory card reading device to be an activated slot, receiving an access command from an electronic device, and accessing a first memory card electrically connected to the first slot according to the access command;

issuing a plurality of continuous access commands to the first memory card according to the access command;

obtaining a busy duration of executing one of the plurality of continuous access commands by the first memory card, and determining whether the busy duration is greater than a duration threshold;

determining an error occurs when performing the access command in response to determining that the busy duration is greater than a duration threshold, and determining whether the error satisfies a switching condition; and in response to determining that the error satisfies the switching condition, setting a second slot of the memory card reading device to be the activated slot, wherein the method further comprises:

obtaining a plurality of history busy durations of the first memory card, calculate a mean and a standard deviation of the plurality of history busy durations, and set the duration threshold according to the mean and the standard deviation.

12. The method of claim 11, further comprising:

in response to determining that the error occurs, accumulating an error count based on the error and determining whether the error count is greater than a counting threshold; and in response to determining that the error count is greater than the counting threshold, determining that the switching condition is satisfied.

13. The method of claim 11, further comprising:

before receiving the access command, setting a first indication device of the memory card reading device to be in a healthy mode, and setting a second indication device of the memory card reading device to be in the healthy mode; and in response to determining that the error satisfies the switching condition, switching the first indication device into an abnormal mode.

* * * * *